Dec. 10, 1968 W. H. HARRISON 3,416,090
CHOPPER STABILIZED DIRECT CURRENT AMPLIFIER
WITH PRECISION PLUS AND MINUS OUTPUT
Filed Oct. 21, 1965
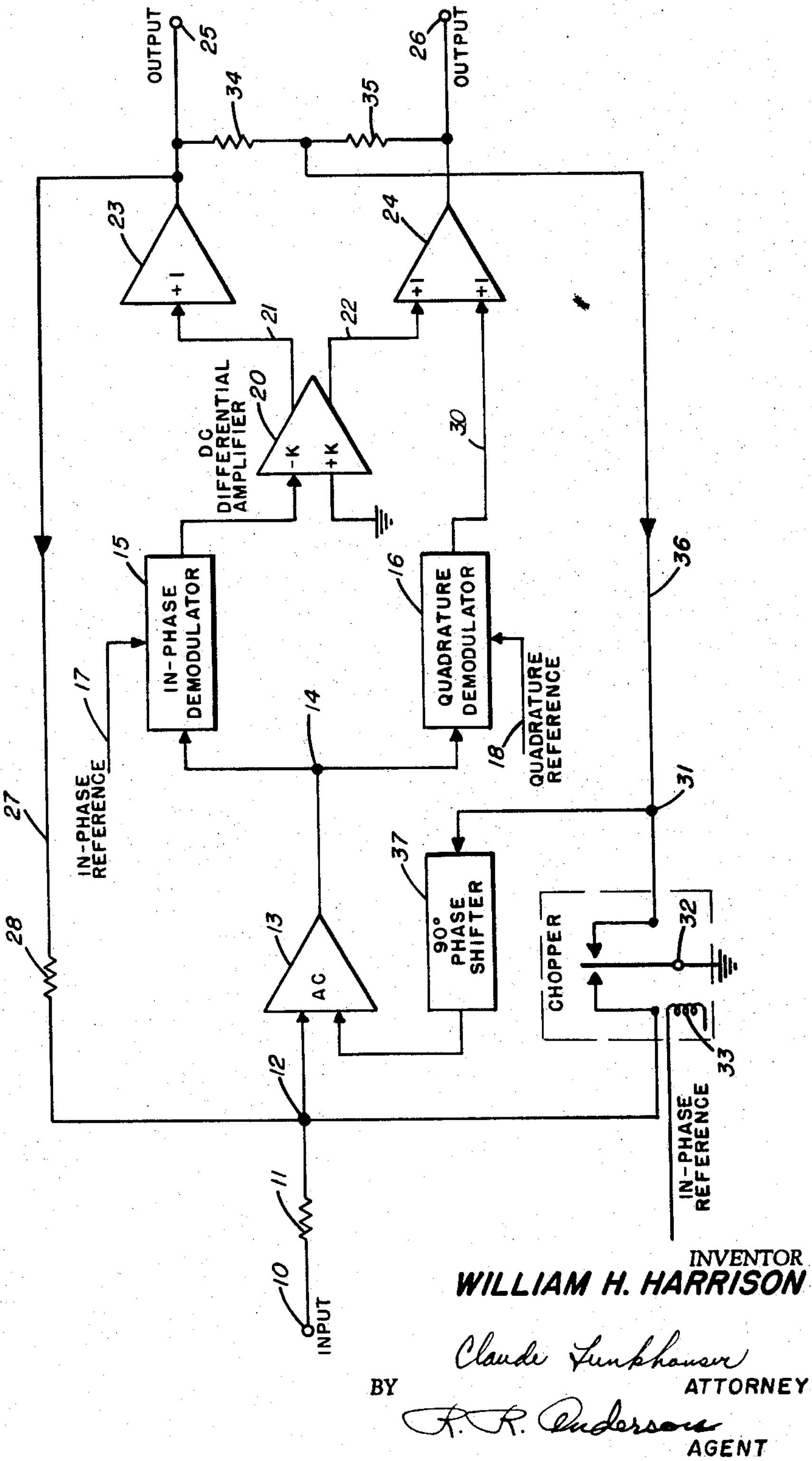
INVENTOR
WILLIAM H. HARRISON
BY Claude Funkhouser
ATTORNEY
R. R. Anderson
AGENT United States Patent Office 3,416,090

Patented Dec. 10, 1968

3,416,090

CHOPPER STABILIZED DIRECT CURRENT AMPLIFIER WITH PRECISION PLUS AND MINUS OUTPUT

William H. Harrison, Chatsworth, Calif., assignor, by mesne assignments, to the United States of America as represented by the Secretary of the Navy Filed Oct. 21, 1965, Ser. No. 500,455
7 Claims. (Cl. 330—10)

ABSTRACT OF THE DISCLOSURE

A high level DC amplifier which provides a normal inverted output and a noninverted output of approximately the same magnitudes. The inverted output is fed back in a normal manner to stabilizer the amplifier. The noninverted output is stabilized by a feedback signal comprising the sum of the two individual outputs. This sum signal is chopped, shifted 90° in phase and summed with the original error signal at the input of the high gain AC amplifier.

The present invention relates to a direct current amplifier and more particularly to a chopper stabilized direct current amplifier having precision plus and minus outputs of equal magnitude.

Direct current amplifiers are widely used in analogue computers, digital to analogue converters, and other systems for such purposes as voltage or current summation, phase inversion, differentiation, integration, and voltage or current regulation. In many applications where high precision is necessary, it is essential that the amplifier meet very stringent gain stability and low direct current drift requirements. Direct current amplifiers are known in the art which achieve gain stability and low drift by applying large amount of negative feedback from the output of the amplifier to the input and by using a chopper amplifier for amplifying the very low frequency and direct current components of the input signal.

The device of the present invention has overcome the above problems by employing a unique system of demodulators, working together with a high gain alternating current amplifier, before the signal is applied to the input of a direct current amplifier. There are two feedback networks employed, with the signal in one of the networks being shifted 90° before it is demodulated by a quadrature demodulator. This particular combination of demodulators and feedback circuits produces a normal inverted output and a non-inverted output, both having high gain and drift stability, and at approximately the same magnitude, as will be seen as the disclosure progresses hereinafter.

An object of the present invention is the provision of a unique direct current amplifier.

Another object is to provide a chopper stabilized direct current amplifier.

Still another object is the provision of a chopper stabilized direct current amplifier having plural output channels.

Yet another object is the provision of a direct current amplifier wherein the signal progressively follows the stages of direct current input to alternating current amplifier to demodulator to direct current amplifier to plural output channels.

Another object is the provision of a direct current amplifier which produces both inverted and non-inverted output signals of equal magnitude.

Still another object is the provision of a direct current amplifier having plural feedback channels for increased stability.

Other objects and many of the attendant advantages of the invention will be readily appreciated as the same becomes better understood by reference to the following detailed description when considered in connection with the accompanying drawing wherein:

FIG. 1 shows a block diagram of the circuit making up the invention.

Referring now to the lone figure of the drawing, there is shown an input terminal 10 for receiving the signal to be amplified, this signal generally being of positive nature. The input signal, after leaving input terminal 10, passes through a dropping resistor 11 before arriving at a junction point 12 from whence it enters a high-gain alternating current amplifier 13.

The output of the alternating current amplifier 13 is fed to a junction point 14 where it divides and enters and inphase demodulator 15 on one hand and a quadrature demodulator 16 on the other hand. An inphase reference voltage is fed, over a lead 17, to the inphase demodulator 15, while a quadrature reference voltage is fed, over a lead 18, to the quadrature demodulator 16.

The demodulated output signal from inphase demodulator 15 is fed into a high level direct current amplifier 20 which is designed to provide both a plus and a minus output of approximately the same magnitude. The minus, or inverted signal from amplifier 20 is now connected over lead 21 to a summing amplifier 23 where it is amplified and applied as a minus or inverted output to an output terminal 25. A portion of the output from amplifier 23 is fed over lead 27, through a dropping resistor 28, to the junction 12 where it is applied to the input of alternating current amplifier 13 in the form of negative or degenerative feedback, thereby adding stability to amplifier 13.

The positive output from differential amplifier 20 is applied, via lead 22 to a summing amplifier 24 from whence it is fed to another output terminal 26. The output from quadrature demodulator 16 is applied via lead 30 as a second input to amplifier 24 where it is summed with the signal appearing on lead 22.

Connected between the junction point 12 and another junction 31 is an electronic chopper 32, the vibrating reed of which is driven by an inphase reference potential applied to a coil 33, the chopper operating to break up or chop the signals present at junction point 31.

Connected across the output terminals 25 and 26, so as to form a voltage divider therebetween are resistors 34 and 35, the two components being of like value. At the junction of resistors 34 and 35 there is tied a lead 36 which in turn is connected to junction 31, lead 36 serving as a negative or degenerative feedback loop to a 90° phase shifter 37, also connected to junction 31. The output of 90° phase shifter 37 is applied as another input to alternating current amplifier 13, where it is summed with the signal applied to terminal 10 and the feedback signals from leads 27 and chopper 32.

The direct current amplifier of the present invention is unique in the fact that it provides a normal inverted output and a non-inverted output, both having high gain and drift stability. In the operation of the amplifier the input signal to be amplified in applied to junction 12 where it is summed with the feedback signal from lead 27 and the feedback signal chopped by electronic chopper 32, and then fed into high gain alternating curren amplifier 13 in the conventional manner. The output o alternating current amplifier 13, as appearing at junctio 14 is demodulated by the inphase demodulator 15 operating in conjunction with inphase reference signal 17 and the product of this demodulation is fed into a hig level direct current amplifier 20 which provides both plus and a minus output of approximately the same magnitude on leads 21 and 22 respectively. The inverted ou put, as appearing from summing amplifier 23 and te minal 25 is fed back over lead 27 to the input of ampl fier 13 in the normal manner to stabilize amplifier 1 through the operation of negative or degenerative feedback.

In addition, another signal is obtained to feedback and stabilize the non-inverted output. This signal is the sum of the two individual outputs (from summing amplifiers 23 and 24) and is obtained from the junction point of resistors 34 and 35 to be fed along lead 36. The signal is then chopped by chopper 32, and connected to the input of alternating amplifier 13 where it is summed with the original error signal from lead 27 at the input of this high gain amplifier. The signal at junction 31 is also shifted 90° in phase by phase shifter 37 and applied as another input to amplifier 13. The phase shifted component of the alternating current amplifier 13 output is fed through junction 14 to quadrature demodulator 16 where with the cooperation of reference signal 18 the phase shifted component is demodulated, and fed along lead 30 to summing amplifier 24 where it is summed with the non-inverted output passing over lead 22. The net effect of this summation is to make the magnitude of the non-inverted output equal to the magnitude of the inverted output.

From the above description of the structure and operation of the present invention it is clear that there is provided a novel chopper stabilized direct current amplifier which offers precision plus and minus outputs, one being inverted and one non-inverted, but both having high drift stability and approximately the same magnitude.

Obviously many modifications and variations of the present invention are possible in the light of the above teachings. It is therefore to be understood that within the scope of the appended claims, the invention may be practiced otherwise than as specifically described.

What is claimed is:

1. A chopper stabilized direct current amplifier comprising a terminal for receiving an input signal to be amplified;

an alternating current amplifier connected to the input terminal for amplifying the signal;

a plurality of demodulators connected to the alternating current amplifier;

a direct current amplifier connected to one of the demodulators, the direct current amplifier providing an inverted and a non-inverted output;

an output terminal connected to the other demodulator;

first feedback means connecting the output of the direct current amplifier and the output of the other demodulator to the alternating current amplifier for increasing the stability of the direct current amplifier;

second feedback means connecting the output of the other demodulator to the alternating current amplifier; and a chopper connected in the second feedback means for breaking up that feedback signal before it is applied to the alternating current amplifier.

2. The chopper stabilized direct current amplifier of claim 1 wherein the plurality of demodulators comprises an inphase demodulator and a quadrature demodulator.

3. The chopper stabilized direct current amplifier of claim 2 wherein the inphase demodulator is connected to the direct current amplifier.

4. The chopper stabilized direct current amplifier of claim 1 further including a plurality of summing amplifiers connected to the outputs of the direct current amplifier, one amplifier being connected to the inverted output and the output amplifier being connected to the non-inverted output.

5. The chopper stabilized direct current amplifier of claim 1 wherein the first feedback means includes a lead for connecting a portion of the inverted output back to the input of the alternating current amplifier, and the second feedback includes a lead for connecting a portion of the sum of the inverted and the non-inverted outputs back to the input of the alternating current amplifier.

6. The chopper stabilized direct current amplifier of claim 5 further including a 90° phase shifter connected to the second feedback lead which is carrying the sum of the inverted and non-inverted outputs.

7. A chopper stabilized direct current amplifier comprising an input terminal for receiving a signal to be amplified;

an alternating current amplifier connected to the input terminal;

an inphase demodulator connected to the output of the alternating current amplifier;

a high level direct current amplifier connected to the inphase demodulator, the direct current amplifier producing an inverted output and a non-inverted output;

a first summing amplifier connected to the inverted output;

a first feedback means connecting the output of the first summing amplifier with the input of the alternating current amplifier;

a second summing amplifier connected to the non-inverted output;

a quadrature demodulator connected between the output of the alternating current amplifier and the second summing amplifier;

a summing network connected between the first and second summing amplifiers;

a chopper connected to the input of the alternating current amplifier;

a second feedback means connected from the summing network to the chopper, so as to chop the feedback signal before it is applied to the alternating current amplifier; and a 90° phase shifter connecting the second feedback means with the input of the alternating current amplifier, whereby the phase shifted component of the alternating current amplifier output is demodulated by a quadrature demodulator and is summed with the non-inverted output so as to make the magnitude of the non-inverted output equal to the magnitude of the inverted output.

References Cited

UNITED STATES PATENTS 3,337,693 8/1967 Silverstein -------- 330—10 X

NATHAN KAUFMAN, *Primary Examiner.*

U.S. Cl. X.R.

330—9

UNITED STATES PATENT OFFICE

CERTIFICATE OF CORRECTION

Patent No. 3,416,090 December 10, 196

William H. Harrison

It is certified that error appears in the above identified patent and that said Letters Patent are hereby corrected as shown below:

Column 4, line 4, "output" should read -- other --.

Signed and sealed this 17th day of March 1970.

(SEAL)
Attest:

Edward M. Fletcher, Jr.
Attesting Officer

WILLIAM E. SCHUYLER, JR.
Commissioner of Patents